(12) United States Patent
Pellizari

(10) Patent No.: US 6,863,537 B2
(45) Date of Patent: Mar. 8, 2005

(54) CARD HOLDER FOR SMART-CARD READER

(75) Inventor: Dirk Pellizari, Wuppertal (DE)

(73) Assignee: Lumberg Connect GmbH & Co. KG, Schalksmuhle (DE)

(*) Notice: Subject to any disclaimer, the term of this patent is extended or adjusted under 35 U.S.C. 154(b) by 0 days.

(21) Appl. No.: 10/633,883

(22) Filed: Aug. 4, 2003

(65) Prior Publication Data

US 2004/0058576 A1 Mar. 25, 2004

(30) Foreign Application Priority Data

Aug. 15, 2002 (DE) .......................................... 102 38 156

(51) Int. Cl.⁷ ................................................. H05K 7/02
(52) U.S. Cl. ....................................... 439/31; 439/108
(58) Field of Search ......................... 439/108, 72, 31, 439/630, 607, 159, 160, 152, 155

(56) References Cited

U.S. PATENT DOCUMENTS

| | | |
|---|---|---|
| 5,226,826 A | 7/1993 | Nillson |
| 5,608,604 A * | 3/1997 | Francis ......................... 439/31 |
| 5,718,609 A | 2/1998 | Braun |
| 6,074,223 A * | 6/2000 | Huang .......................... 439/95 |
| 6,083,010 A * | 7/2000 | Daoud .......................... 439/31 |
| 6,149,466 A * | 11/2000 | Bricaud et al. ............. 439/630 |

* cited by examiner

*Primary Examiner*—Renee Luebke
(74) *Attorney, Agent, or Firm*—Herbert Dubno; Andrew Wilford

(57) ABSTRACT

A card holder has a dielectric base fixed to a grounded support and formed with a throughgoing cutout and a conductive cover forming a slot dimensioned to hold a smart card and pivotal on the base between an open position partially raised from the base and a closed position closely juxtaposed with the base and covering the cutout. Ground contacts carried on and electrically connected to the cover are positioned to engage through the cutout directly with the base in the closed position of the cover. The cover can also be grounded via a latch that holds it in the closed position and/or the hinge it is mounted on.

10 Claims, 3 Drawing Sheets

… (US 6,863,537 B2)

CARD HOLDER FOR SMART-CARD READER

FIELD OF THE INVENTION

The present invention relates to a card holder. More particularly this invention concerns a card holder for a smart-card reader.

BACKGROUND OF THE INVENTION

A smart card, also known as an IC-card or a chip card, is a flat normally plastic card that may be as large as a credit card or, in particularly when used as an SIM (subscriber identity module), as small as a postage stamp. Such a card carries active and passive circuit elements. When used, for instance, as a SIM card it has a small processor and enough memory to hold data regarding the identity and preferences of a user. Such a SIM card is commonly used in a cellular telephone to allow a user to transfer his or her phone book and other data from one phone to another.

The card reader must fulfill several functions in addition to the obvious one of forming connections between contact points on the card and traces of the printed-circuit board normally carrying th holder. First of all it must hold and protect the card physically, something that is particularly important as, for instance, in a cell phone the card holder is in the bottom of the battery compartment where it is exposed as batteries are changed. In addition the card holder must shield the card, in particular from inductive and RF (radio-frequency) fields, another problem particularly present in a cell phone where the card is located a few centimeters from a transmitter.

Thus the typical card holder as described in U.S. Pat. No. 5,226,826 has a cover provided with flanges forming a slot into which the card can be slid. The cover is pivotal on a plastic base between an open position in which the slot is exposed for insertion and removal of the card and a closed position flush with the base. Spring contacts in the base bear against terminals on the card in the closed position, and in turn are connected to SMD (surface-mount device) contacts that themselves are soldered to a circuit board or similar support in the device equipped with the card holder.

For best shielding, the standard practice is to make the cover of electrically conductive material, normally metal, and to ground it. The holder can have contacts in the base that engage the cover as in U.S. Pat. No. 5,718,609. Such systems have the disadvantage that the ground connection is not sure. Such use of ground contacts in the base engaging the cover means that another SMD connection must be made between the ground contacts in the base and the support, normally a circuit board, to which the base is fixed, and this extra connection is also capable of failure.

OBJECTS OF THE INVENTION

It is therefore an object of the present invention to provide an improved card holder for a smart-card reader.

Another object is the provision of such an improved card holder for a smart-card reader which overcomes the above-given disadvantages, that is which provides a ground connection for the cover that is simple yet very stable.

SUMMARY OF THE INVENTION

A card holder has according to the invention a dielectric base fixed to a grounded support and formed with a through-going cutout and a conductive cover forming a slot dimensioned to hold a smart card and pivotal on the base between an open position partially raised from the base and a closed position closely juxtaposed with the base and covering the cutout. Ground contacts carried on and electrically connected to the cover are positioned to engage through the cutout directly with the base in the closed position of the cover.

Thus with this system closing the cover automatically establishes a connection directly with ground when it is closed, not via any intermediaries. The connection is direct, especially when according to the invention the ground contacts are of the same material as the cover, in fact unitary with the cover. Normally the ground contacts are formed as spring fingers. Thus these ground contacts can be provided without appreciably increasing the production costs of the card holder.

In accordance with the invention the ground contacts are formed at an edge of the cover. They are offset from the card slot. Thus the ground contacts reach past the card and engage the grounded support and grounds the cover before the card actually engages the contacts on the base that form the electrical connections with the contact points on the card.

According to another aspect of the invention, a latch between the cover and the base releasably secures the cover in the closed position and includes a grounded element on the base engageable with the cover only in the closed position. Thus when the cover is latched, it is grounded directly by he latch. The grounded element is a latching tab fixed to the base. More particularly, the tab is formed with a tongue engageable with the cover and holding it against the base only in the closed position. The base includes a contact connected to the grounded support and to the tab and a part imbedded in the base.

In accordance with yet another aspect of the invention, a hinge has a part on the base connected to the grounds support and a part integral with the cover in electrically conductive engagement with the part on the base. This hinge functions at all times to maintain the cover grounded, even when open. Of course any of these grounding systems—via the ground contacts, via the latch, and via the hinge—can be used alone or in addition to any of the other systems.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
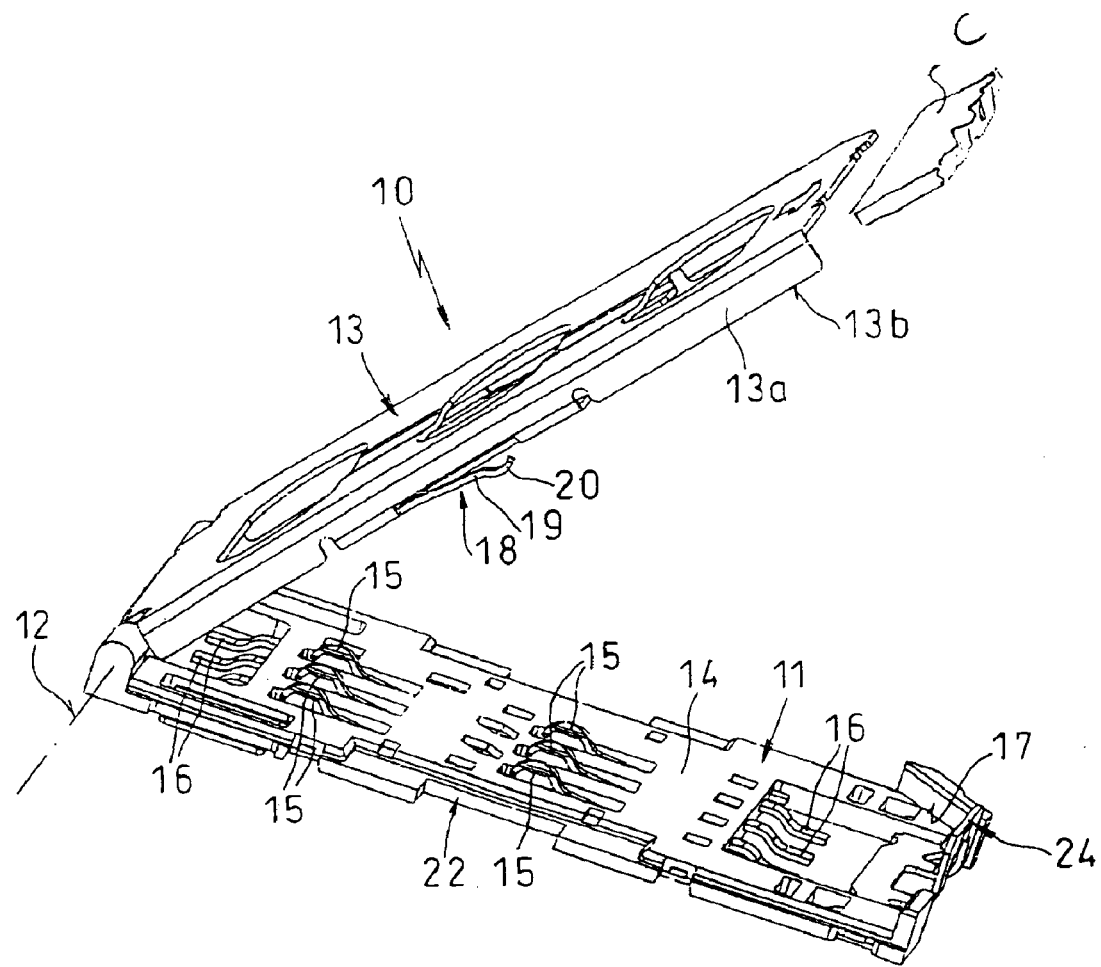
FIG. 1 is a perspective view of the card holder according to the invention in the open position.
Figure 2:
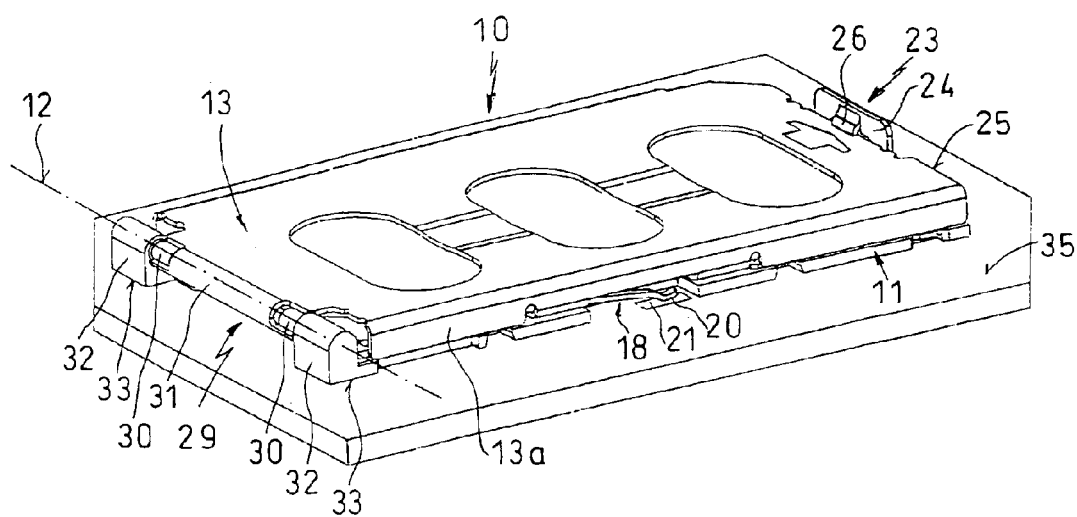
FIG. 2 is a perspective view of the card holder in the closed position.
Figure 3:
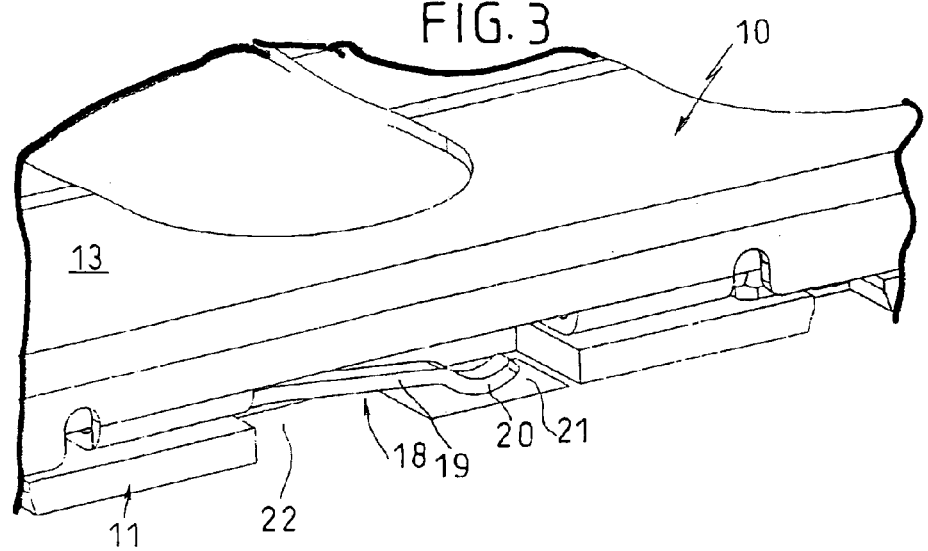
FIG. 3 is a large-scale view of a detail of FIG. 2.
Figure 4:
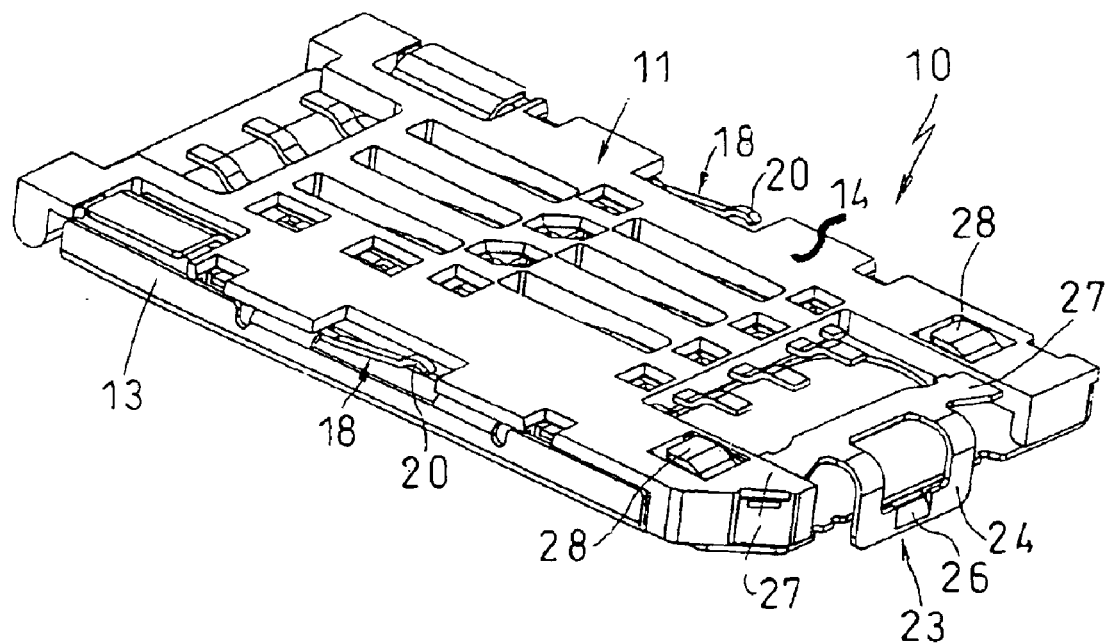
FIG. 4 is a perspective view of the bottom of the card holder in closed position.
Figure 5:
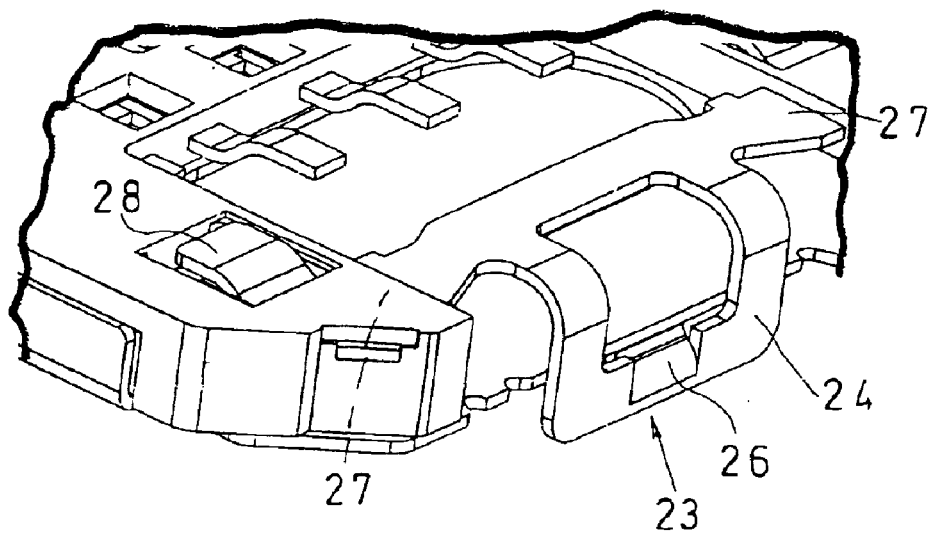
FIG. 5 is a large-scale view of a detail of FIG. 4.

As seen in FIG. 1 a card holder 10 according to the invention basically comprises a dielectric molded-plastic base 11 and a conductive sheet-metal cover 13 pivoted about a transverse axis 12 on the base 11. The base 11 has a body 14 provided with the standard six spring-type reader contacts 15 engageable with a card shown partially at C that can engage in a slot on the underside of the cover 13. SMD contacts 16 associated with the contacts 15 are exposed at a bottom plane of the base 11 and serve for connection to grounded traces of a support 21, here a printed-circuit board carried on an electrical device 35 (FIG. 2). One corner of the base 11 has a stop 17 to ensure proper orientation of the card C which has a beveled corner as is well known in the art. The cover 13 is pivotal relative to the base 11 about the axis 12 between the open position of FIG. 1 and the closed position of FIGS. 2–5.

According to the invention the cover 13, which could also be formed of an electrically conductive plastic, has side flanges 13a from edges 13b of which project ground contacts 18 each comprising a finger 19 having a tip 20 that can engage in the closed position of the holder 10 through a respective cutout 22 formed in the base 11. Thus in the closed position the actual material of the cover 13 is in direct contact with grounded traces of the support 21 as clearly shown in FIGS. 2 and 3. The ground contacts 18 and cutouts 22 are offset from the card C, in fact flank it, so that the fingers 19 reach past the card C and actually contact the support 21 as the cover 13 is closed, even before its contact points engage the contacts 15.

At its outer end the cover 13 is held in its closed position by a latch 23 formed in part by a tab 24 extending in a plane perpendicular to the cover 13 in the closed position and parallel to the axis 12 and having arms 27 (See FIGS. 4 and 5) imbedded in the plastic of the base body 14 and formed with tabs 28 that are normally soldered to the grounded support 21. The tab 24 has a tongue 26 projecting somewhat toward the axis 12 and engageable with th metallic cover 13 adjacent its outer edge 25 to secure the cover 13 in the closed position. Elastic deflection of the eye 24 away from the axis 12 pulls the tongue 26 off the cover 13 and allows the latch 23 to be opened and the cover 13 to swing up, normally aided by a weak torque spring that is not illustrated here.

At its inner end a hinge 29 defining the axis 12 is comprised of a pivot pin 30 seated in a cylindrical formation at the inner hinge end and a pair of gudgeons 32 secured at 33 to the base 11. The pivot pin 30 and gudgeons 32 are electrically conductive, here of metal, and the connection surface 33 is grounded. Thus the cover 13 is also grounded via the hinge 29 and the latch 23.

I claim:

1. In combination with a grounded support and a smart card, a card holder comprising:

a dielectric base fixed to the support and formed with a throughgoing cutout exposing the grounded support;

a conductive cover forming a slot dimensioned to hold the card;

a hinge on the dielectric base pivotally carrying the conductive cover for movement between an open position with the cover and the card in the slot partially raised from the base and a closed position with the cover and the card in the slot closely juxtaposed with the base and covering the cutout; and a ground contact carried on and electrically connected to the cover and positioned to engage through the cutout directly with the grounded support in the closed position of the cover.

2. The card holder defined in claim 1 wherein the ground contact is of the same material as the cover.

3. The card holder defined in claim 2 wherein the ground contact is formed as a spring finger.

4. The card holder defined in claim 2 wherein the ground contact is unitary with the cover.

5. The card holder defined in claim 2 wherein the ground contact is formed at an edge of the cover.

6. The card holder defined in claim 1 wherein the ground contact is offset from the card slot.

7. In combination with a grounded support and a smart card, a card holder comprising:

a dielectric base fixed to the support;

a conductive cover forming a slot dimensioned to hold the card and pivotal on the base between an open position partially raised from the base and a closed position closely juxtaposed with the base; and latch means between the cover and the base for releasably securing the cover in the closed position and including a grounded latching tab fixed to the base and engageable with the over only in the closed position.

8. The card holder defined in claim 7 wherein the tab is formed with a tongue engageable with the cover and holding it against the base only in the closed position.

9. The card holder defined in claim 7 wherein the base includes a contact connected to the grounded support and to the tab.

10. The card holder defined in claim 7 wherein the tab has a part imbedded in the base.

* * * * *